United States Patent [19]

Salem

[11] Patent Number: 4,807,440
[45] Date of Patent: Feb. 28, 1989

[54] INTERNAL COMBUSTION ENGINE

[76] Inventor: Ahmed Salem, P.O. Box 6838, Jedah 21452, Saudi Arabia

[21] Appl. No.: 109,538

[22] Filed: Oct. 19, 1987

Related U.S. Application Data

[63] Continuation-in-part of Ser. No. 18,727, Feb. 24, 1987, abandoned, which is a continuation of Ser. No. 760,557, Jul. 30, 1985, abandoned.

[51] Int. Cl.$^4$ ............................................. F02C 5/00
[52] U.S. Cl. ...................................... 60/727; 60/39.76
[58] Field of Search ............... 60/39.44, 39.465, 39.75, 60/39.76, 39.79, 727, 39.43

[56] References Cited

U.S. PATENT DOCUMENTS

| | | | |
|---|---|---|---|
| 820,238 | 5/1906 | Moss | 60/39.75 |
| 2,547,560 | 4/1951 | Brodzinsky | 60/39.76 |
| 4,087,961 | 5/1978 | Aveny | 60/39.465 |
| 4,299,086 | 11/1981 | Madgavkar et al. | 60/39.465 |
| 4,380,897 | 4/1983 | Zaba | 60/39.465 |
| 4,686,822 | 8/1987 | Frutschi | 60/727 |

*Primary Examiner*—Louis J. Casaregola
*Attorney, Agent, or Firm*—Fetherstonhaugh & Co.

[57] ABSTRACT

An internal combustion engine in which the energy generated by combustion is converted into kinetic energy in the form of a high speed jet of exhaust gases which is used to drive a rotor which in turn drives a power output shaft. The engine comprises a housing having a rotor chamber formed therein. A combustion chamber located in close proximity to said rotor chamber. A nozzle is provided which has an input end communicating with the output passage of the combustion chamber and an output end communicating substantially tangentially with the rotor chamber. A rotor is mounted for rotation in said rotor chamber on the power take-off shaft. The rotor has a plurality of pockets extending inwardly from and spaced about its outer periphery. An exhaust port opens from the rotor chamber and is circumferentially spaced from the output passage of the nozzle. A source of compressed combustible gaseous fuel communicates with the input passage of the combustion chamber. The operation of the input and output flow control valve of the combustion chamber and the ignition means is controlled to achieve the required combustion and expansion.

5 Claims, 6 Drawing Sheets

INTERNAL COMBUSTION ENGINE

PRIOR APPLICATIONS

This application is a continuation-in-part of application Ser. No. 018,727 filed Feb. 24, 1987 (abandoned), which is a continuation of application Ser. No. 760,557 filed July 30, 1985 (abandoned).

This invention relates to internal combustion engines. In particular, this invention relates to an internal combustion engine in which the energy generated by combustion is converted into kinetic energy in the form of a high speed jet of exhaust gases which is used to drive a rotor.

In conventional internal combustion engines, a substantial proportion of the energy generated in the combustion process is lost due to the fact that the exhaust gases are exhausted to atmosphere at a pressure substantially above atmospheric pressure. In addition, because the combustion gases are expanded in an expandable combustion chamber, it is necessary to seal the piston with respect to the combustion chamber to maintain the compression in the chamber and these seals generate substantial friction which contribute to efficiency losses and which are subject to a great deal of wear.

In U.S. Pat. No. 2,547,560 dated Apr. 3, 1951 to J. Brodzinsky, an engine is disclosed in which the fuel is pumped into the combustion chamber by means of pumps which are located in close proximity to each combustion chamber. This pump is used for the purposes of pumping the fuel into the combustion chamber and does not serve to provide a constant pressure head. The concept of providing a pressure head which has a substantial capacity is not disclosed or suggested by Brodzinsky and there is nothing in the teaching of Brodzinsky to suggest that the pumps be used for any purpose other than injecting a charge of fuel into the combustion chamber. In addition, Brodzinsky does not disclose or suggest the use of a nozzle located between the combustion chamber and the rotor wherein the nozzle has a convergent section communicating directly with the combustion chamber into which the products of combustion are discharged to thereby convert the pressure energy into kinetic energy.

In the Moss U.S. Pat. No. 820,238, the combustion chambers which are formed about the rotor are compression chambers in which the gas is compressed before ignition. This requires a very complex and expensive compressor mechanism at each compression chamber. In addition, the valve which is located in the output from the compression chamber is located downstream of the only portion of the discharge which is a convergent portion with the result that no convergent nozzle is provided downstream from the combustion chamber. The cone-shaped upper end of the combustion chamber will not function as a nozzle because it is an integral part of the combustion chamber and is not separated from the combustion chamber by a valve. It is not effective in converting the pressure energy to kinetic energy because when the gaseous medium is being discharged it will not flow through the nozzle in the form of a convergent stream.

I have found that these difficulties can be overcome to a substantial extent by causing the combustion gases to be discharged from the combustion chamber through a nozzle which is isolated from the combustion chamber by a valve which is arranged to direct a high speed jet against a rotor which is in turn caused to rotate in a rotor chamber thereby to drive a power output shaft.

According to one aspect of the present invention, I provide an internal combustion engine which comprises a housing having a rotor chamber formed therein, a combustion chamber in which combustion is to be carried out at a predetermined combustion pressure, said combustion chamber having a predetermined capacity and being located in close proximity to said rotor chamber, said combustion chamber having an input passage and an output passage having, respectively, input and output flow control means, ignition means in said combustion chamber for igniting a combustable fuel in use, a nozzle having an input end communicating with said output passage of said combustion chamber and an output end communicating substantially tangentially with said rotor chamber, said nozzle having a convergent portion extending from said input end which is shaped to maximize the discharge velocity while permitting the pressure of the combustion gasses to drop to substantially atmospheric pressure, a rotor mounted for rotation in said rotor chamber on a power take-off shaft, said rotor having a plurality of pockets extending inwardly from and spaced about its outer periphery, an exhaust port opening from said rotor chamber and being circumferentially spaced from said output passage of said nozzle, a pressure head storage reservoir having a pressure head storage chamber formed therein which communicates with said combustion chamber through the input passage to the combustion chamber, said pressure head storage chamber having a storage capacity which is greater than the predetermined capacity of the combustion chamber by an amount which will permit the combustion chamber to be charged with a charge of gaseous medium drawn from the pressure head storage chamber without reducing the pressure head in the pressure head storage chamber below said predetermined combustion pressure, means for establishing said pressure head in said pressure head combustion chamber before a first charge of gaseous medium is drawn from the storage chamber into the combustion chamber and for maintaining the pressure head in the storage chamber during successive recharging of the combustion chamber with gaseous medium, opening said input flow control means to admit a charge of combustable fuel to said combustion chamber when said output flow control means is closed and then closer said input flow control means, igniting said charge and then opening said output flow control means to allow the exhaust gas to discharge through said nozzle into said rotor chamber in the form of a high speed jet which impinges against the perimeter of the rotor and causes it to rotate to drive said power take-off shaft, and to locate successive pockets in a position to receive a portion of the exhaust gas which is discharged from said nozzle and thereafter to repeat the above steps.

The invention will be more clearly understood after reference to the following detailed specification read in conjunction with the drawings, wherein.

Figures 1, 2:
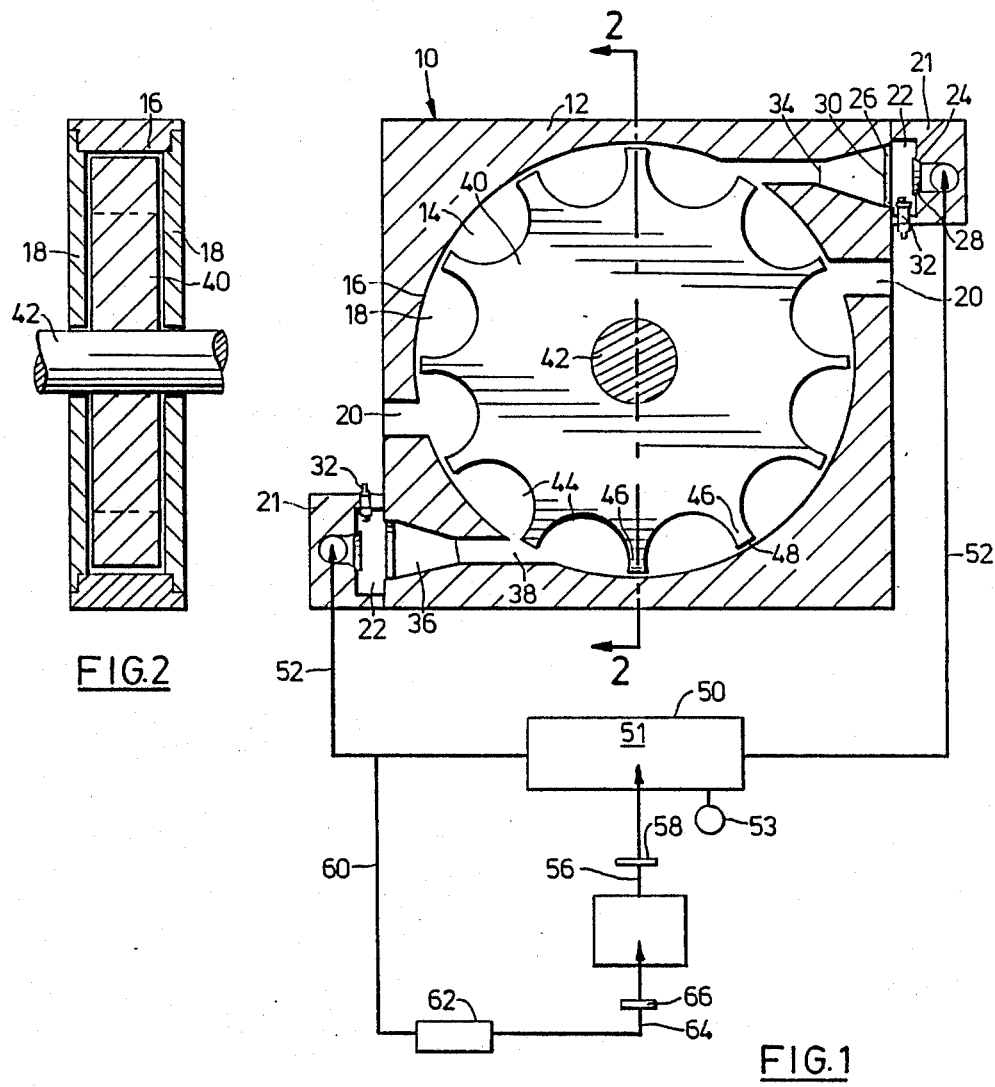
FIG. 1 is a diagrammatic representation of an engine constructed in accordance with an embodiment of the present invention shown in cross-section.
FIG. 2 is a section taken along the line 2—2 of FIG. 1.

With reference to FIG. 1 of the drawings, the reference numeral 10 refers generally to an internal combustion engine constructed in accordance with an embodiment of the present invention. The engine 10 consists of a housing 12 which is formed with a rotor chamber 14 which has a cylindrical-shaped peripheral wall 16 and oppositely disposed end walls 18. Exhaust ports 20 open from the rotor chamber 14 to atmosphere.

Combustion housings 21 are secured to the housing 12 and cooperate therewith to form combustion chambers 22 which have an input passage 24 and an output passage 26. An input flow control valve 28 is located in the input passage 24 and an output flow control valve 30 is located in the output passage 26. The valves 28 and 30 are operable to open and close the respective passages 24 and 26 as required in use. An ignition spark plug 32 communicates with the chamber 22 and is operable to ignite a charge of combustible fuel located in the combustion chamber 22 in use.

Nozzles 34 are formed in the housing 12 and extend from the combustion chambers 22 into the rotor chamber 14. The nozzles 34 have an input end 36 communicating with the output passage of the combustion chamber and an output end 38 which communicates substantially tangentially with the rotor chamber. The nozzles 34 are preferably shaped to maximize the discharge velocity while permitting the pressure of the combustion gases to drop to substantially atmospheric pressure such that it is the kinetic energy of the discharging stream which impinges upon the rotor 40 which is mounted for rotation in the rotor housing 14 on a power take-off shaft 42. Although not all of the as will be fully expanded through the nozzle to atmospheric pressure, it will be understood that at least a portion of this expansion which takes place after the nozzle is effective in driving the rotor and is not therefore lost. A plurality of pockets 44 are formed about the perimeter of the rotor at circumferentially spaced intervals and are separated from one another by divider walls 46.

It will be noted that the outer edge 48 of the divider walls 46 is spaced from and therefore not in frictional engagement with the cylindrical wall 16 of the rotor chamber.

A pressure head storage reservoir 50 is formed with a pressure head storage chamber 51 therein. The pressure head storage chamber 51 serves to store a supply of compressed gaseous medium which may be in the form of a combustible mixture of air and gaseous fuel or air. The pressure head storage chamber 51 communicates with the input passage 24 of the combustion chambers 22 through conduits 52. The pressure head storage chamber has a storage capacity which is greater than the predetermined capacity of at least one of the combustion chambers by an amount which will permit one of the combustion chambers to be charged with a charge of gaseous medium drawn from the pressure head storage chamber without reducing the pressure head in the pressure storage chamber below the predetermined combustion pressure required in the combustion chamber. If, for example, the predetermined combustion pressure is set at 250 PSI, then the pressure head storage chamber may be precharged to a pressure of about 350 PSI with the relative size of the combustion chamber 22 and the pressure head storage chamber being such that the pressure in the pressure head storage chamber will drop to about 250 PSI when a charge is drawn from the pressure head storage chamber into the combustion chamber.

A compressor 54 is provided for the purposes of compressing the gaseous medium and supplying it through a conduit 56 and a one-way valve 58 to the pressure head storage chamber 51. The compressor 54 is preferably in the form of a piston pump which has a sufficient capacity to replenish the pressure head at a rate which is at least equal to the rate at which the gaseous medium is withdrawn into the combustion chambers in use. As will be described hereinafter, this pump is driven directly from the power output shaft of the rotor when the engine is running. In the embodiment illustrated in FIG. 1 where two combustion chambers are provided, the pump 54 may be driven by the rotor at a speed which is twice that of the rotor. In a further embodiment where three, four or more combustion chambers may be provided, the pump may be driven at a speed which is three, four or more times that of the speed of the rotor so as to correspond to the number of combustion chambers which are provided. To prevent excessive pressure build-up in the conduits 52, I provide a feedback conduit 60 in which a check valve 62 is located and which communicates with the input conduit 64 to the compressor 54. A one-way valve 66 is located in the input conduit 64.

In use, the compressor 54 is operated to build up the pressure in the storage chamber 50 to the operating pressure required for the fuel supply system. One or both of the valves 28 are opened to admit a charge of combustible fuel to the combustion chamber 22. The valve or valves 28 are then closed and the fuel is then ignited by the spark plug and the valve 30 is then opened to permit the combustion gases to expand into the nozzle 34. The expanding combustion gases expand through the nozzle to reduce the pressure thereof to approach atmospheric pressure and to increase the velocity thereof to a velocity approaching sonic or supersonic velocity whereby a jet of discharging gas is directed toward the rotor to impinge upon the perimeter of the rotor and thereby cause the rotor to rotate to drive the power take-off shaft 42.

Figure 3:
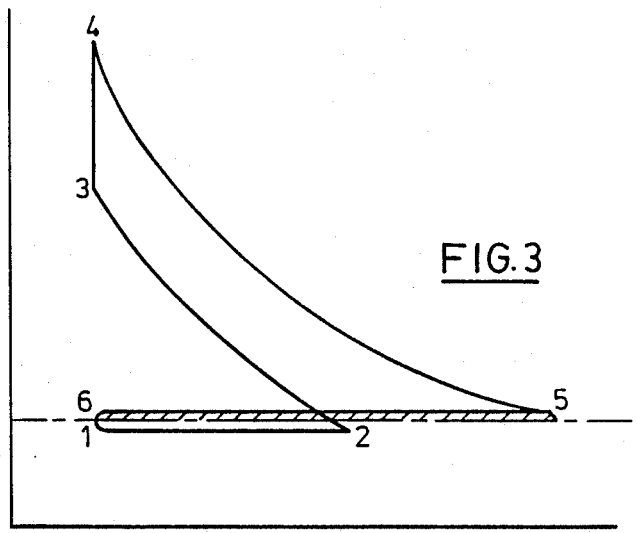
FIG. 3 is a diagram illustrating the various strokes of the cycle of the engine of FIG. 1 when operating on a cycle comparable to the otto cycle.

FIG. 3 of the drawings illustrates the cycle of operation of the engine of the present invention when operating on the "Otto" cycle. The air/fuel mixture is drawn into the pump 54 at a substantially constant pressure and this step is diagrammatically illustrated by the line 1-2. The air/fuel is then compressed by the compressor 54 and this step is diagrammatically illustrated by the line 2-3. The air/fuel mixture is then admitted to the combustion chamber 22 and this mixture fuel is then ignited as previously described and this step is illustrated by the line 3-4. During this step, there is a substantial increase in pressure at a substantially constant volume. The fuel is the expanded through the nozzle 34 and beyond the nozzle exit to a pressure only slightly above atmospheric pressure and this step is illustrated by the line 4-5. The exhaust gases are then exhausted to atmosphere and this step is illustrated by the line 5-6. It will be apparent that because of the conversion of the energy of the combustion gases to kinetic energy through the nozzle and beyond, it is possible to expand the gases to a pressure which is substantially lower than that which can be achieved by a reciprocating piston engine, it is possible to achieve a substantial increase in efficiency.

Figure 4:
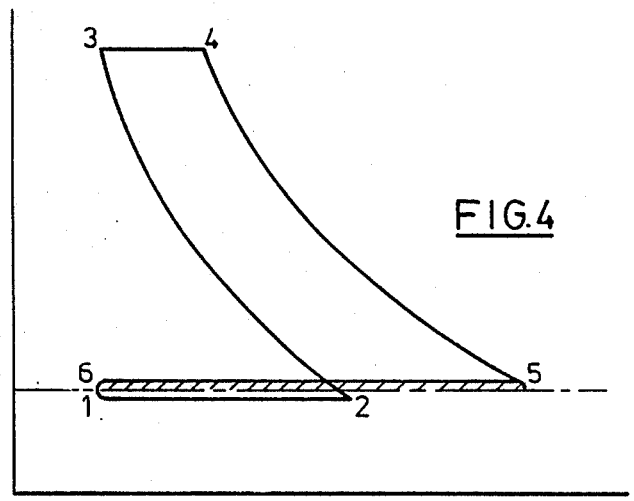
FIG. 4 is a diagram similar to FIG. 3 illustrating the operating sequence of an engine of the present invention operating on a diesel cycle.

FIG. 4 illustrates the cycle when the engine operates on a diesel engine cycle, the principal difference being that the ignition illustrated by the line 3-4 occurs at substantially constant pressure while in the Otto cycle, the ignition 3-4 occurs at substantially constant volume. The constant pressure ignition is achieved by opening the valve 30 at the point of ignition and the constant volume ignition is achieved by maintaining the valve 30 closed during ignition.

Figure 5:
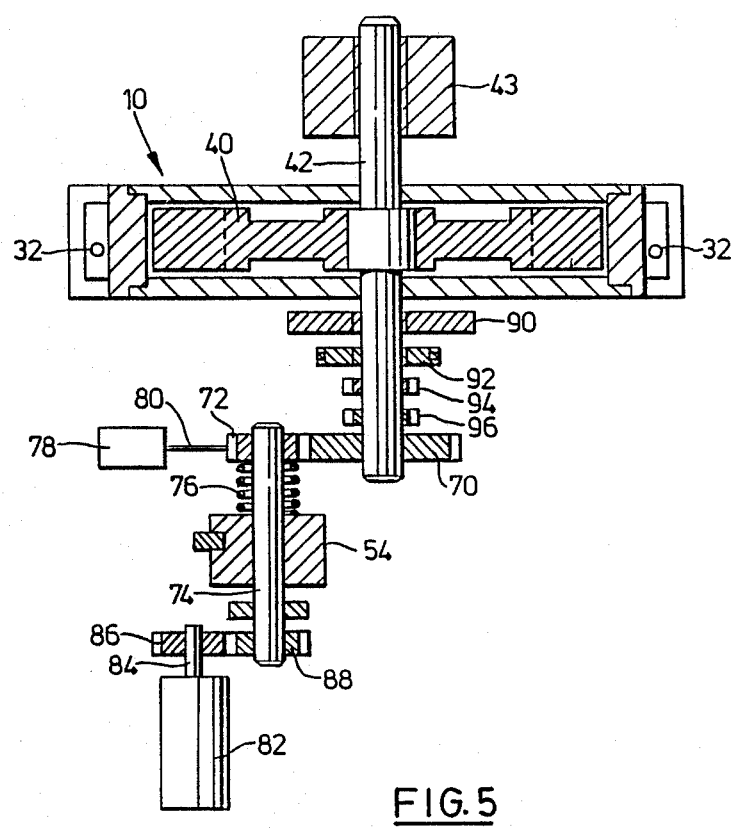
FIG. 5 is a partially sectioned view illustrating the power transmission system used to connect the drive shaft of the rotor to the pump and the starter.

FIG. 5 of the drawings serves to illustrate the power transmission connections between the power take-off shaft 42 and the pump 54. As shown in FIG. 5 of the drawings, a gear 70 is mounted on the shaft 42. A gear 72 is mounted on the shaft 74 of the pump 54 and a compression spring 76 is arranged to urge the gear 72 toward a position in which it is meshed with the gear 70. A solenoid 78 is provided which has an arm 80 which is movable when the solenoid 78 is activated to move the gear 72 out of meshing engagement with the gear 70 to compress the spring 76. In this way, the pump 54 can be disconnected from the power take-off shaft 42 of the engine. A starter motor 82 has an output shaft 84 on which a gear 86 is mounted. When the starter motor is activated the gear 86 meshes with a gear 88 which is mounted on the shaft 74. The starter motor 84 may be a conventional starter motor of the type used to start the motor of an automobile or the like which commonly incorporates a mechanism of moving the starter pinion to and fro between first position out of engagement with the engine fly wheel sprocket. In the present application when the starter motor is activated, it will serve to move the gear 86 into engagement with the gear 88 and when the starter motor is deactivated, it will serve to disengage the gears 86 and 88.

In use, when the engine is to be started, the solenoid 78 is activated to disengage the gear 72 from the gear 70 thereby disconnecting the shaft 74 of the pump 54 from the power take-off shaft 42. The starter 82 can then be activated to drive the pump to build up the pressure in the pressure head storage tank 50 to the required pressure head. When the required pressure head is achieved the solenoid 78 is deactivated to allow the gear 72 to mesh with the gear 70. By activating the starter 82, the power take-off shaft 42 is then driven to in turn rotatably drive the rotor 40.

For the purposes of opening and closing the valves 28 and 30, I provide a cam 90 which is mounted on the power take-off shaft 42. Although the engine of the present invention will not generate excessive heat, I prefer to provide a cooling water jacket (not shown) which may be located in the walls 18 and around the combustion chambers 22 and for the purposes of circulating water therethrough I provide a pulley 92 which is mounted on the shaft 42 and which may be connected to a conventional water pump and alternator. In addition, I provide a cam 94 which is mounted on the shaft 42 and which may be used for the purposes of driving a conventional fuel pump. In an application where liquid fuel is injected into the combustion chamber, the conventional fuel pump may be driven from the cam 94. A gear 96 is also mounted on the power take-off shaft 42 and may be used to drive a distributor or a triggering circuit for electronic ignition. Alternatively, the cam 90 may be used to rigger the ignition system. These various power take-offs are of an conventional nature and are not therefore described in detail.

Figure 6:
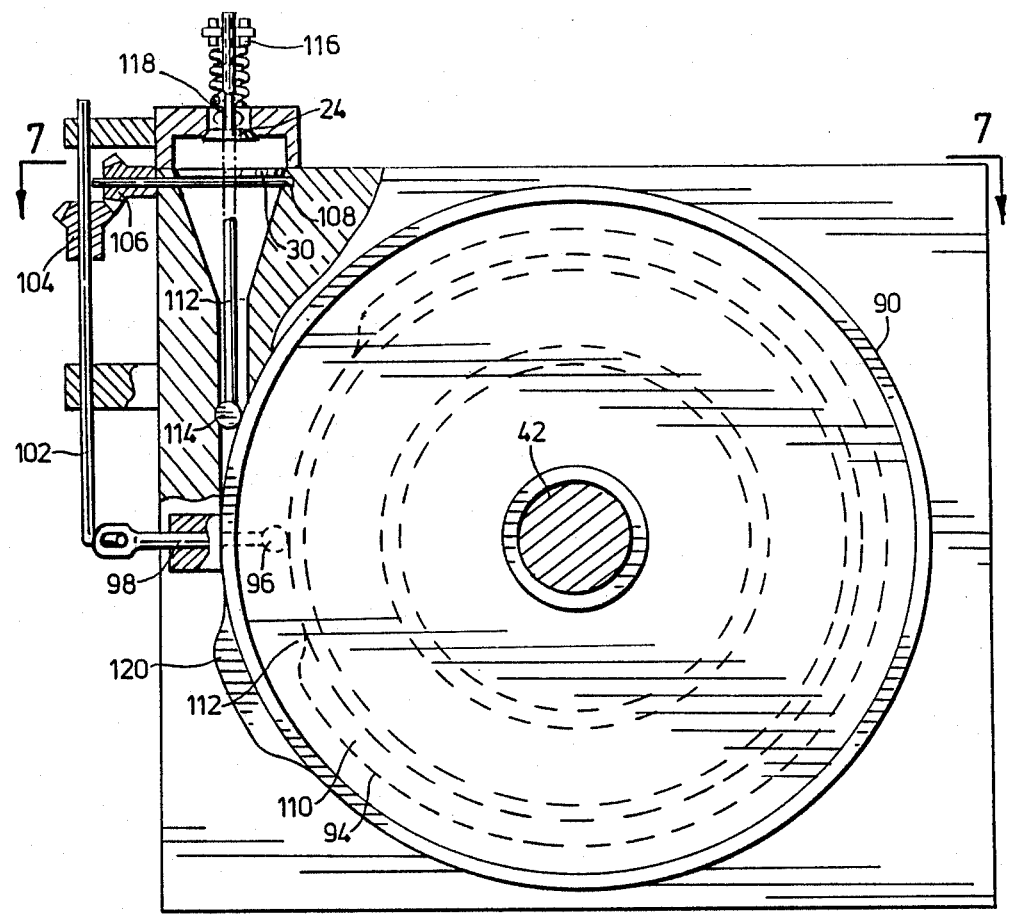
FIG. 6 is a side view illustrating a mechanism for use in opening and closing the valve system.
Figure 7:
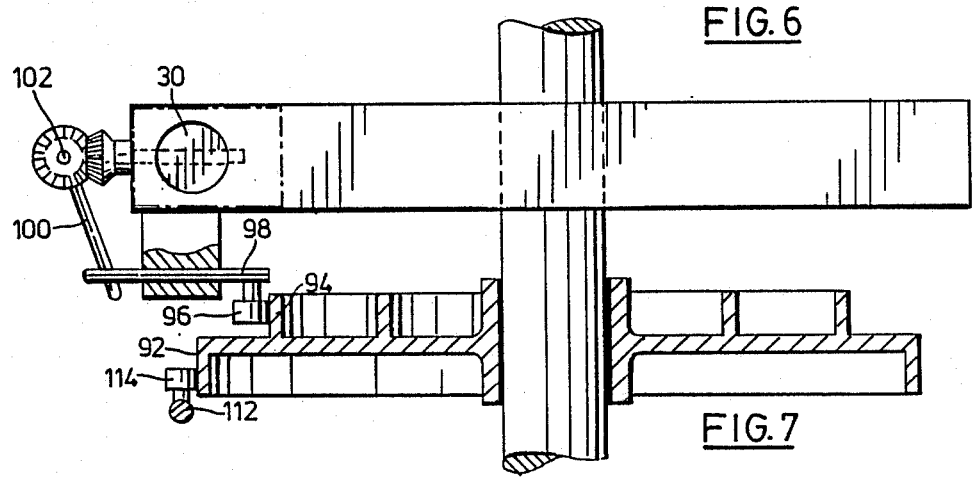
FIG. 7 is an end view of the mechanism of FIG. 6.

FIGS. 6 and 7 serve to illustrate a mechanism suitable for use in opening and closing the valves 28 and 30. As shown in FIGS. 6 and 7, the cam 90 has a cam track 92 formed at its outer perimeter and a cam track 94 located inwardly from the outer perimeter. The cam track 92 is used for the purposes of controlling the opening and closing of the valve 28 and the cam track 94 is used to control the opening and closing of the valve 30. The mechanism for opening and closing the valve 30 includes a follower 96 which is mounted on a rod 98. The rod 98 is connected to a further rod 100 which is in turn connected to the shaft 102 upon which a gear 104 is drivingly mounted. The gear 104 is meshed with a gear 106 carried by the shaft 108 on which the valve 30 is mounted. When the follower 96 is engaged by the node 110, the valve 30 will be displaced to an open position and will return to the closed position when the follower is relocated in the valley 112 of the cam track 94.

A similar operating mechanism which includes a rod 112, a follower 114, a rocker-arm 116 and a valve stem 118 is provided for opening and closing the valve 24 in response to engagement with the node 120 of the cam track 92. The valve stem 118 is connected to valve 24 and is caused to reciprocate to open and close in response to movement of the shaft 112. It will, however, be understood that various alternative mechanisms may be provided for the purposes of opening and closing the valves 24 and 30 and the mechanism described above is only one such mechanism.

Figure 9:
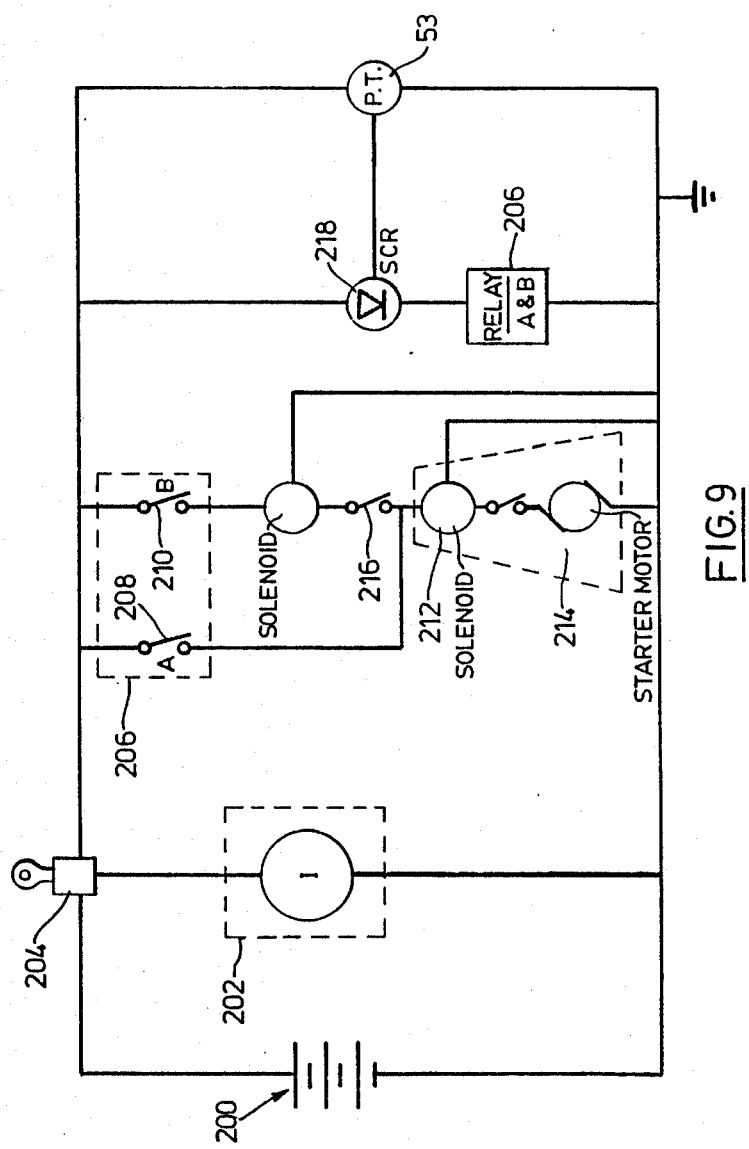
FIG. 9 is a diagram illustrating the electronic circuit for the engine starting and ignition sequence.

With reference to FIG. 9 of the drawings, the reference numeral 200 refers generally to a source of electrical power such as a battery. A conventional ignition circuit is generally identified by the reference numeral 202 and is connected in series with the battery through the contact ignition key switch 204. The circuit also includes a relay 206 which has contacts 208 and 210. A solenoid 78 is connected to the relay switch 210. The starter motor assembly 82 is also illustrated. The starter motor assembly includes a solenoid 212 and a motor 214. A switch 216 is located between the solenoid 78 and the solenoid 212.

A circuit control rectifier (SCR) 218 is provided which is triggered by a pressure transducer 53 which is also shown in FIG. 1.

In use, the contact switch is activated to complete the circuit through the contact switch. As a result, the solenoid 78 of the clutch is activated to cause the gear 72 to disengage from gear 70. After the gears have been disengaged, the further operation of the solenoid will close the switch 216. This will supply power to the starter solenoid which will in turn drive the starter pinion 86 into engagement with the gear wheel 88. When the pinion 86 is engaged with the gear wheel 88, the starter motor 214 will be activated to drive the output shaft 84, thereby driving the pump 54 to build up the pressure head in the pressure head storage chamber 51. When the pressure in the pressure head storage chamber 51 reaches the required predetermined pressure head level, the pressure transducer 53 will emit an electronic pulse which will trigger the SCR which will in turn activate the relay 206 to cause the switch 208 to close and the switch 210 to open. This will have the effect of deactivating the solenoid 78 which will have the effect of moving the gear 72 into driving engagement with the gear 70 so that the pump 54 will be drivingly connected to the output drive shaft of the rotor. In this condition, the starter motor 82 is connected to the rotor 40 through the pump and will serve to rotatably drive the rotor. Ignition will then occur and the rotor will become self-propelled. As soon as this condition is detected by the operator, the ignition key will be released to allow it to automatically return to a position in which the starter circuit is deactivated. When the engine is to be stopped, the ignition key can be moved to a further position in which the battery is isolated from the ignition circuit in a conventional manner. In use, as previously indicated, the pump 54 is initially disconnected from the power take-off shaft 42. The starter 82 is then activated to drive the pump 54 to build up the pressure head in the pressure head storage tank 50 to that required to operate the system. When this pressure head is reached, the solenoid 78 is automatically deactivated by a control system (not shown) so that the spring 76 serves to move the gears 72 into engagement with the gear 70 thereby connecting the power take-off shaft 42 to the drive shaft 74 of the pump. The starter 82 will then drive the rotor. When the power take-off shaft 42 is driven, the opening and closing the valves 28 and 30 is controlled by the cam 90 as previously described and the firing sequence is controlled by the gear 96 or pulley 92 or cam 90. Initially, the valve 28 will open while the valve 30 remains closed, thereby admitting the combustible fuel mixture to the combustion chamber 22. Thereafter, further rotation of the cam 90 will cause the valve 28 to close. The ignition system will then be activated to ignite the fuel mixture and immediately thereafter, the valve 30 will be opened such that the combustion gases will expand through the nozzle 34 in the form of a jet which will impinge on the rotor 40 and will drive the rotor 40. The starter 82 will then be deactivated and disengaged from the shaft 74. The engine is then operating to drive the power take-off shaft 42 which in turn drives any conventional load diagrammatically illustrated at 43. The power take-off shaft 42 also drives the pump/compressor 54 to continue to supply compressed gases to the storage receptacle 50. A suitable gear ratio is provided between the gears 70 and 72 to ensure that the pump 54 is capable of supplying a sufficient amount of compressed gas to the receptacle 50 to maintain the required operating pressure.

As indicated in FIG. 1 of the drawings, two combustion chambers 22 and nozzles 34 may be provided. It will also be apparent that any number of additional combustion chambers and nozzles may be provided to increase the power output of the system.

Figure 8A:
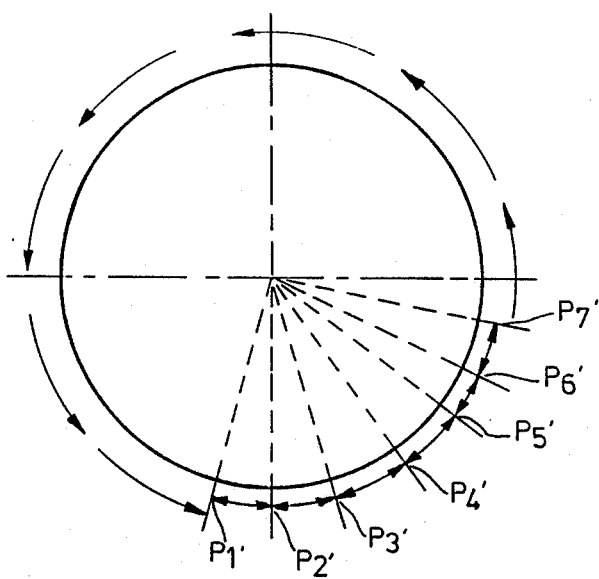
FIG. 8a is a diagram illustrating the sequence of events for one of the combustion chambers of the engine of FIG. 1.
Figure 8B:
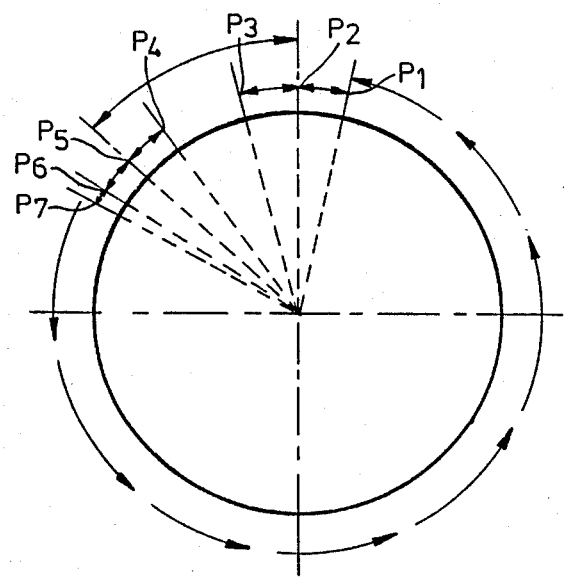
FIG. 8b illustrates the sequence of events for the other of the combustion chambers.

FIG. 8a is a diagram illustrating the sequence of events for one of the combustion chambers of the engine of FIG. 1 and FIG. 8b illustrates the sequence of events for the other combustion chamber. With reference to FIG. 8b, it will be seen that the valve 30 (FIG. 1 of a first of the combustion chambers will begin to close at the point P1 and will be fully closed at the point P2. At the point P2, the valve 28 of the first combustion chamber will begin to open, thus admitting the pressurized air or air/fuel mixture from the storage chamber 50 into the compression chamber. The valve 28 will begin to close at the point P4 and will be fully closed at the point P5. From the point P5 to the point P6, the air fuel mixture will be ignited with the combustion being substantially complete at the point P6. At the point P6, the valve 30 will begin to open and will be fully opened at the point P7. The dwell time between the positions P6 and P7 is preferably minimized to ensure that it will open as quickly as possible. From the position P7 to the position P1, the valve 30 will remain open to allow for the conversion of the pressure energy of the gas to kinetic energy through the nozzle. A great deal of momentum is gained by the combustion products during this period and it is transferred to the rotor as a direct rotating motion because of the sudden change in gas velocity during their interaction with the relatively slowly moving rotor. Also, toward the end of the travel between the positions 7 and 1, the exhaust gases will vent through the exhaust port 20. The events in the second combustion chamber are identical to those previously referred to and are identified by the same reference characters with the addition of a prime indicator.

It will be understood that the events designated by the points P1 through P7 and P1' through P7' occur during the same revolution of the rotor.

Various modifications of the present invention will be apparent to those skilled in the art. It will be understood that an electronic form of ignition may be used for the purposes of controlling the firing sequence and timing. In addition, an alternative form of valve opening and closing mechanism may he used for opening and closing the valves 28 and 30. Furthermore, the compressed gas which is compressed by the compressor 54 and stored in the receiver 50 may be in the form of compressed air with the combustible fuel being injected by conventional injection nozzles into the combustion chambers 22 as required in use in the manner similar to that used in a conventional diesel engine system. When the engine is to operate on a diesel cycle or while a fuel injection system is to be used, the gaseous medium which is pumped into the head storage reservoir may be air without any fuel added thereto. These and other modifications will be apparent to those skilled in the art.

I claim:

1. An internal combustion engine comprising:
   (a) a housing having a rotor chamber formed therein,
   (b) a combustion chamber in which combustion is to be carried out at a predetermined combustion pressure, said combustion chamber having a predetermined capacity and being located in close proximity to said rotor chamber, said combustion chamber having an input passage and an output passage having, respectively, input and output flow control means,
   (c) ignition means in said combustion chamber for igniting a combustable fuel in use,
   (d) a nozzle having an input end communicating with said output passage of said combustion chamber and an output end communicating substantially tangentially with said rotor chamber, said nozzle having a convergent portion extending from said input end which is shaped to maximize the discharge velocity while substantially atmospheric pressure,
   (e) a rotor mounted for rotation in said rotor chamber on a power take-off shaft, said rotor having a plurality of pockets extending inwardly from and spaced about its outer periphery, (f) an exhaust port opening from said rotor chamber and being circumferentially spaced from said output passage of said nozzle, (g) a pressure head storage reservoir having a pressure head storage chamber formed therein for storing a pressurized gaseous medium in the form of air or an air/fuel mixture, said head storage chamber communicating with said combustion chamber through the input passage to the combustion chamber, said pressure head storage chamber having a storage capacity which is greater than the predetermined capacity of the combustion chamber by an amount which will permit the combustion chamber to be charged with a charge of gaseous medium drawn from the pressure head storage chamber without reducing the pressure head in the pressure head storage chamber below said predetermined combustion pressure, (h) means for establishing said pressure head in said pressure head storage chamber before a first charge of gaseous medium is drawn from the storage chamber into the combustion chamber and for maintaining the pressure head in the storage chamber during successive recharging of the combustion chamber with gaseous medium, (i) means for selectively opening and closing said input and output flow control means to open said input flow control means to admit a charge of said gaseous medium from said storage chamber to said combustion chamber when said output flow control means is closed and then close said input flow control means, (j) means for igniting said charge, and (k) said means for selectively opening and closing said input and output flow control means then being operable to open said output flow control means to allow the exhaust gas to discharge through said nozzle into said rotor chamber in the form of a high speed jet which impinges against the perimeter of the rotor and causes it to rotate to drive said power take-off shaft, and to locate successive pockets in a position to receive a portion of the exhaust gas which is discharged from said nozzle and thereafter to repeat steps I and II.

2. An internal combustion engine as claimed in claim 1, wherein the pressure head storage reservoir is remote from the combustion chamber.

3. An internal combustion engine as claimed in claim 1, wherein a plurality of combustion chambers are provided at circumferentially spaced intervals about the rotor chamber, said pressure head storage chamber communicating with each of said combustion chambers in parallel.

4. An internal combustion engine as claimed in claim I, wherein said nozzle has a conversion section which extends from its input end, and valve means located between the input end of the nozzle and the combustion chamber and being operable to open to permit combustion gases to flow into and through the convergent portion of the nozzle after combustion.

5. An internal combustion engine as claimed in claim 1, further comprising:
(a) a first drive shaft mounting said rotor for rotation in said rotor chamber, first gear means on aid first drive shaft,
(b) a pump having a second drive shaft, second gear means mounted on said second drive shaft,
(c) means for moving said second gear means to and fro between as first position drivingly engaging said first gear means and a second position out of engagement with said first gear means, third gear means on said second shaft,
(d) starter motor having a power output shaft, a starter pinion mounted on said power output shaft and means for moving said starter pinion to and fro between a first position out of engagement with said third gear means and a second position drivingly engaging said third gear means whereby said pump means may be initially driven by said motor means when said first and second gear means are disengaged to establish the pressure head in said pressure reservoir and after the pressure head is established, the means for moving the second gear means being activated to locate the second gear means in driving engagement with the first gear means and the starter clutch mechanism is deactivated to disengage the starter pinion and the third gear means whereby when the engine is operating in a self-propelled mode, the pump is driven directly from the engine.

* * * * *